(12) United States Patent
Beaver

(10) Patent No.: US 11,907,656 B2
(45) Date of Patent: *Feb. 20, 2024

(54) MACHINE BASED EXPANSION OF CONTRACTIONS IN TEXT IN DIGITAL MEDIA

(71) Applicant: Verint Americas Inc., Alpharetta, GA (US)

(72) Inventor: Ian Beaver, Spokane Valley, WA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,898

(22) Filed: Mar. 28, 2022

(65) Prior Publication Data

US 2022/0284188 A1 Sep. 8, 2022

Related U.S. Application Data

(63) Continuation of application No. 16/513,073, filed on Jul. 16, 2019, now Pat. No. 11,288,451.

(60) Provisional application No. 62/699,516, filed on Jul. 17, 2018.

(51) Int. Cl.
*G06F 40/253* (2020.01)
(52) U.S. Cl.
CPC .................................. *G06F 40/253* (2020.01)
(58) Field of Classification Search
None
See application file for complete search history.

(56) References Cited

U.S. PATENT DOCUMENTS

| | | | | |
|---|---|---|---|---|
| 4,868,750 A * | 9/1989 | Kucera | ................. | G06F 40/253 704/8 |
| 6,314,411 B1 * | 11/2001 | Armstrong | .............. | G10L 15/18 706/45 |
| 10,824,661 B1 * | 11/2020 | Huang | .................. | G06F 16/358 |
| 2004/0078190 A1 * | 4/2004 | Fass | ........................ | G06F 16/38 704/7 |
| 2006/0200340 A1 * | 9/2006 | Fontenelle | ............ | G06F 40/232 704/5 |

(Continued)

OTHER PUBLICATIONS

Yannick Couzinie, Expander, GitHub, Last modified Nov. 8, 2017, https://github.com/yannick-couzinie/expander. (Year: 2017).*

(Continued)

*Primary Examiner* — Frank D Mills
(74) *Attorney, Agent, or Firm* — Meunier Carlin & Curfman LLC

(57) ABSTRACT

As described herein, a system for expanding contractions in electronically stored text includes expanding contractions having only on expanded form. For remaining contractions, a grammar check is performed for all possible expanded forms to determine if an expanded form can be selected based on context and grammar rules. If an expanded form is not evident from the first two steps, all possible expanded forms of the remaining contractions are converted to a vector representation along with the original text. A Word Movers Distance (WMD) for each possible expansion is calculated using the vectors for each possible expansion and the original text. An expanded form is chosen without human intervention based on the grammar score alone or the WMD and the grammar score.

18 Claims, 1 Drawing Sheet

(56) References Cited

U.S. PATENT DOCUMENTS

| | | | | |
|---|---|---|---|---|
| 2008/0004862 | A1* | 1/2008 | Barnes | G06F 40/151 704/4 |
| 2012/0303358 | A1* | 11/2012 | Ducatel | G06F 40/30 704/9 |
| 2013/0191739 | A1* | 7/2013 | Bank | G06F 40/157 715/259 |
| 2016/0041990 | A1* | 2/2016 | Dabah | G06F 40/274 707/736 |
| 2016/0132300 | A1* | 5/2016 | Bernelas | G06F 8/427 717/109 |
| 2019/0057143 | A1* | 2/2019 | Porter | G06F 16/285 |
| 2019/0182382 | A1* | 6/2019 | Mazza | H04L 51/02 |

OTHER PUBLICATIONS

Yannick Couzinie, Expander, GitHub, Last modified Nov. 8, 2017, https://github.com/yannick-couzinie/expander/blob/master/contractions.yaml. (Year: 2017).*

Yannick Couzinie, Expander, GitHub, Last modified Nov. 8, 2017, https://github.com/yannick-couzinie/expander/blob/master/disambiguate.py. (Year: 2017).*

Yannick Couzinie, Expander, GitHub, Last modified Nov. 8, 2017, https://github.com/yannick-couzinie/expander/blob/master/disambiguations.yaml. (Year: 2017).*

Yannick Couzinie, Expander, GitHub, Last modified Nov. 8, 2017, https://github.com/yannick-couzinie/expander/blob/master/expander.py. (Year: 2017).*

Castro-Castro, Daniel, Reynier Ortega Bueno, and Rafael Munoz. "Author Masking by Sentence Transformation." In CLEF (Working Notes). 2017. (Year: 2017).*

Beaver, I., "contractions.py," Python Package Index, retrieved on Jan. 15, 2021 from https://files.pythonhosted.org/packages/cc/4c/dcf983b504ee880d5e74bd86f3bf24bd23271067b69a6c41f10f005187e1/pycontractions-11.0.1.tar.gz, 2017, 9 pages.

Beaver, I., "Pycontractions," Release 1.0.1, retrieved on Dec. 31, 2019 from https://libraries.jo/pypi/pycontractions/1.0.1, 2017, 4 pages.

Bojanowski, P., et al., "Enriching Word Vectors with Subword Information," Transactions of the Association for Computational Linguistics, vol. 5, 2017, 12 pages.

Definition of "Contraction", retrieved on Oct. 24, 2019 from https://en.wikipedia.org/wiki/Contraction, May 21, 2019, 2 pages.

Definition of "Word2vec", retrieved on Oct. 24, 2019 from https://en.wikipedia.org/wiki/Word2vec, Oct. 20, 2019, 6 pages.

Definition of "Word embedding," retrieved on Oct. 24, 2019 from https://en.wikipedia.org/wiki/Word_embedding, Aug. 29, 2019, 5 pages.

Kusner, M., et al., "From Word Embeddings to Document Distances," Proceedings of the 32$^{nd}$ International Conference on Machine Learning (PMLR), vol. 37, 2015, pp. 957-966.

List of English contractions, retrieved on Oct. 24, 2019 from https://en.wikipedia.org/wiki/Wikipedia:List_of_English_contractions, Oct. 18, 2019, 8 pages.

Mikolov, T., et al., "Efficient Estimation of Word Representations in Vector Space," International Conference on Learning, 2013, 12 pages.

Park, A., et al., "Automatically Detecting Failures in Natural Language Processing Tools for Online Community Text," Journal of Medical Internet Research, vol. 17, No. 8, 2015, e212, 16 pages.

Pennington, J., et al., "GloVe: Global Vectors for Word Representation," Proceedings of the 2014 Conference on Empirical Methods in Natural Language Processing (EMNLP), 2014, pp. 1532-1543.

Volk, M., et al., "Disambiguation of English Contractions for Machine Translation of TV Subtitles," Proceedings of the 18$^{th}$ Nordic Conference of Computational Linguistics (NODALIDA), 2011, pp. 238-245.

Extended Search Report, dated Nov. 13, 2019, received in connection with EP Patent Application No. 19186731.6.

* cited by examiner

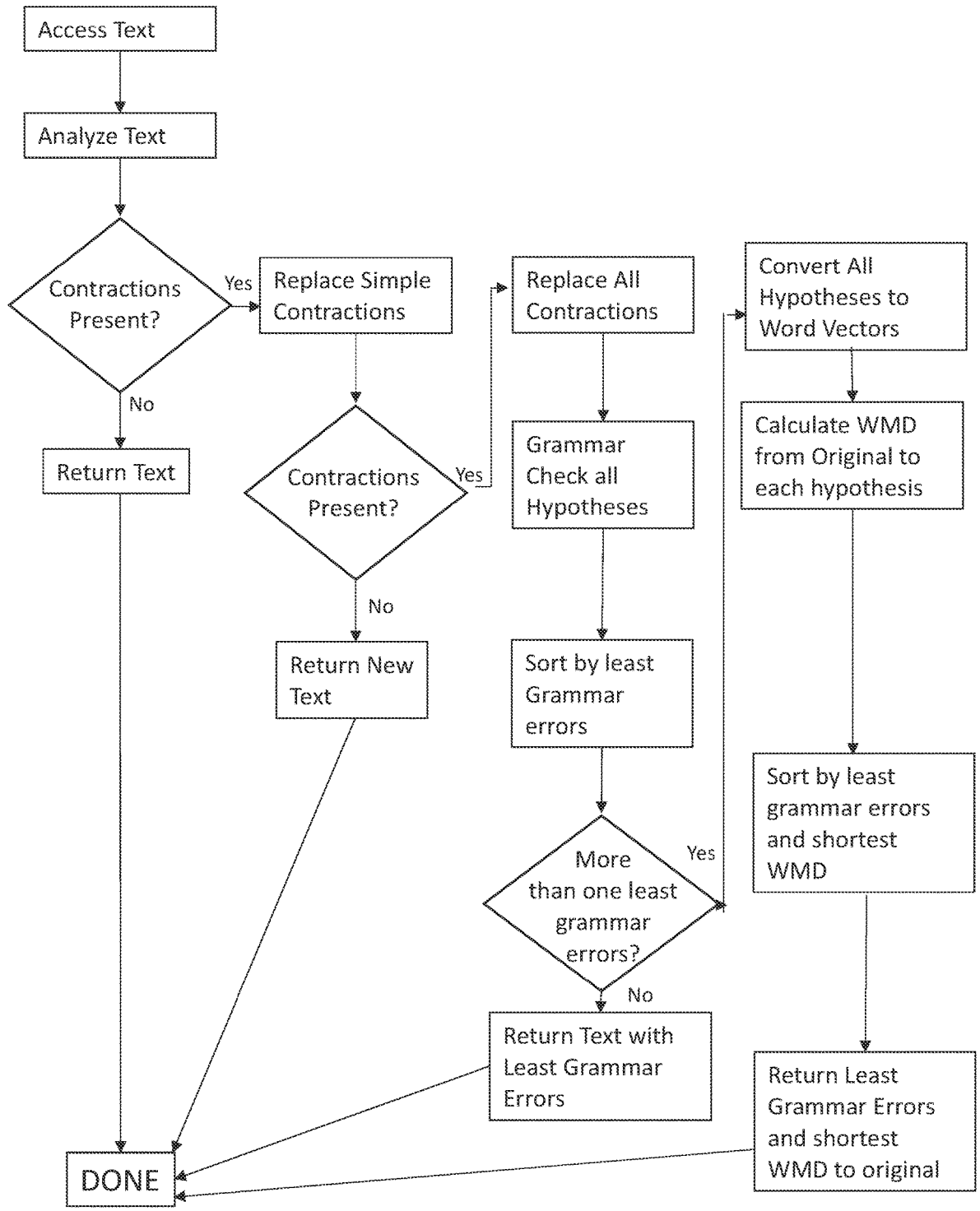

MACHINE BASED EXPANSION OF CONTRACTIONS IN TEXT IN DIGITAL MEDIA

CROSS REFERENCE TO RELATED APPLICATIONS

This application is a Continuation application of U.S. patent application Ser. No. 16/513,073, filed Jul. 16, 2019, pending, which claims priority benefit of U.S. Provisional Patent Application No. 62,699,516, filed Jul. 17, 2018, expired, which applications are hereby incorporated by this reference in their entireties.

BACKGROUND OF THE INVENTION

Field of the Invention

Embodiments of the present invention relate to a machine-based method for expanding contractions with an improved degree of accuracy.

Background

In grammar, a contraction is "a shortened version of the written and spoken forms of a word, syllable, or word group, created by omission of internal letters and sounds."[1] Contractions are generally formed from words that would otherwise appear together in sequence. Contractions are common in many languages such as English, French, Chinese, Italian, Hebrew, Spanish, and more. Contractions can be easily inserted into text automatically by simple replacement rules. For example, the rule for forming a contraction for the phrase "I would" is straight forward:

I would→I'd
 can be used to replace all occurrences of "I would" in a text with "I'd".

Expanding contractions into the correct form, on the other hand, is not as simple as it requires contextual knowledge in order to choose the correct replacement words. For example, "I'd" could expand to at least two different expansion forms, such as:

I'd→I would
I'd→I had

Given that a significant amount of text is generated electronically, e.g., using a computer, a tablet, a cell phone or other electronic device by which the "text" is really represented in machine language of some type, a reliable method for expanding contractions in the machine language can improve the functioning of electronically based text generation and editing systems.

Multiple different expansion forms of many contractions have resulted in machine expansion of contractions to their proper expanded form being often inaccurate and, hence, unreliable.

Accordingly, the present application is directed to a machine-based method for expanding contractions with a high degree of accuracy.

BRIEF SUMMARY

Accordingly, the present invention is directed to machine-based expansion of contractions in text in digital media that obviates one or more of the problems due to limitations and disadvantages of the related art. In accordance with the purpose(s) of this invention, as embodied and broadly described herein, this invention, in one aspect, relates to a method of expanding contractions in electronically stored text without human intervention, wherein a library of contractions is available electronically includes identifying a contraction in the electronic text; substituting an expanded form of the contraction in the text for the contraction if the library of contractions defines only a single expanded form of the contraction; if the library of contractions defines more than one expanded form of the contraction, substituting each expanded form of the contraction in the text and performing a grammar check to provide a grammar score for each expanded form in context of the text and evaluating if only one expanded form is grammatically correct; if only one expanded form is grammatically correct, substituting the grammatically correct expanded form in the text for the contraction; if the more than one expanded form is grammatically correct or no expanded form is grammatically correct, converting all expanded forms and the contraction to vector representations using a word embedding model and calculating a word movers distance for each expanded form with respect to the electronic text; selecting an expanded form for substitution of the contracting in the text based on the grammar score and the word mover's distance calculated; and substituting the selected expanded form for the contraction in the text.

Further embodiments, features, and advantages of the machine-based method for expanding contractions, as well as the structure and operation of the various embodiments of the machine-based method for expanding contractions, are described in detail below with reference to the accompanying drawings.

It is to be understood that both the foregoing general description and the following detailed description are exemplary and explanatory only and are not restrictive of the invention as claimed.

BRIEF DESCRIPTION OF THE DRAWINGS

The accompanying FIGURES, which are incorporated herein and form part of the specification, illustrate a machine-based method for expanding contractions. Together with the description, the FIGURES further serve to explain the principles of the machine-based method for expanding contractions described herein and thereby enable a person skilled in the pertinent art to make and use the machine-based method for expanding contractions.

FIG. 1 is a flow chart showing an exemplary set of steps for performing an automatic expansion of contractions in a text according to principles described herein.

DETAILED DESCRIPTION

Reference will now be made in detail to embodiments of the machine-based method for expanding contractions.

This method takes a three-pass approach to replacing contractions in an electronically based text. The machine acts upon text in memory during its processing. That text could originate from a text file, database, web page, or any persistent format. It could also originate from a word processor or WYSIWYG editor application if this method was added to the editor software. A "what you see is what you get" editor is a system in which content (text and graphics) can be edited in a form closely resembling its appearance when printed or displayed as a finished product, such as a printed document, web page, or slide presentation. Regardless of the origin, the text will be read from the origin format into memory where the expansion will take place. The resulting form of the text can then be replaced in the originating file or displayed to the user in editor software.

The first pass is simple contractions, the second pass is applying grammar checking, and the third pass is a Word Movers Distance (WMD) calculations. In the first pass, contractions are identified in an electronic or "digitized" text in which contractions need to be expanded. In some instances, this system and method can be applied to a hard copy text by converting the hard copy text to digitized or electronic form.

According to principles described herein, contractions that may be "simple contractions" are identified in the electronic text. For example, it is determined if each contraction is a simple contraction with only one possible expansion (i.e., there is only a single rule for expansion for the contractions at hand). The contractions identified as simple contractions are replaced with the appropriate expanded form for the simple contraction replaces the simple contraction. That is, first, the simple contractions with only a single rule are replaced. For example, "can't" would be replaced with the only appropriate expandable form "cannot". Thus, in the first pass, any contractions that can be replaced without analyzing the context of the contraction are fixed.

If any contractions remain after the first pass in which "simple contractions" are expanded, multiple rules are used to generate all possible hypothesis of expansions. On the second pass if any contractions are present with multiple rules, those contractions are replaced with all combinations of rules to produce all possible texts. Then each hypothesis is grammar checked and the number of grammatical errors in it is saved. If only one hypothesis has the least number of grammar errors, it is returned as the expanded form. If more than one hypothesis remains with the same number of grammar errors, then it moves to the third pass.

In the third pass, each possible text is modeled using "word embedding" such that each word is represented by a vector. That is, the text of each hypothesis and the original text are converted to word vector representations using a supplied word embedding model. The embeddings are used to calculate a Word Mover's Distance (WMD) between the original sentence and a possible form with an expansion inserted. If modeled as a vector, a value of the WMD can be calculated between each possible text and the original text, for example, a matrix of word vectors is generated using the supplied word embedding model. Then the word vector matrix is passed to the WMD calculation along with the word vector matrix of the original input. The WMD is calculated between each hypothesis matrix and the original matrix and the hypothesis with the shortest WMD from the original is returned as the expanded form.

The WMD is calculated between the original text containing the contraction and the original text with the contraction replaced by the expanded form. The amount of text used for the comparison is, for example, a sentence. So if a sentence contains a contraction, that sentence is converted into a word embedding matrix, then the hypothesis of the same sentence is converted with the expanded form into a word embedding matrix, and the WMD between the two is calculated.

To calculate the WMD, first the text is translated into a vector space by using an embedding model. An embedding model can be trained for any language using various means such as Word2Vec [2] or GloVe [3]. Once the original text and each hypothesis is represented by matrix of word vectors, the resulting word vectors are passed to the word movers distance calculation between the two. The WMD can be calculated between the original text matrix and each hypothesis matrix to yield the WMD score. Thus, a WMD is calculated for each possible text.

As described in "From Word Embeddings to Document Distances," Kusner et al., Proceedings of the 32nd International Conference on Machine Learning, Lille, France, 2015. JMLR: W&CP volume 37, which is hereby incorporated by references, the WMD distance measures the dissimilarity between two text documents as the minimum amount of distance that the embedded words of one document need to "travel" to reach the embedded words of another document. Thus, after passing each possible text through a grammar checker and the WMD calculation, each possible text has a grammar score (e.g., the number of grammatical errors in the text) and a WMD distance. The possible texts (hypotheses) are then sorted by least number of grammatical errors and shortest distance from the original text and the top hypothesis is returned as the expanded form to be passed to the third step in the process.

The grammatical error count eliminates the worst choices, but there are many cases that contain no or the same number of grammatical errors. In these cases, the WMD works as the tie-breaker. WMD is the minimum weighted cumulative cost required to move all words from the original text to each hypothesis. This leverages the underlying word embedding model chosen. As the difference between each hypothesis is only the replacement of a contraction with its expansion, the "closest" hypothesis to the original text will be that with the minimum Euclidean distance between the contraction and expansion word pair in the word embedding space according the WMD.

An example:
Original text:
We ain't all the same.
The possible expansion rules for the contraction ain't:
ain't→am not
ain't→are not
ain't→is not
ain't→has not
ain't→have not
This method would first generate a list of all possible expansions:
['We have not all the same',
'We am not all the same',
'We are not all the same',
'We has not all the same',
'We is not all the same']
It would then feed each possible expansion (hypothesis) through a grammar checker to get the number of grammar errors present. Any automatic grammar checking program for the text language can be used for this. The list will be updated with the error count as (Hypothesis, # of grammar errors present):
[('We have not all the same', 0),
('We am not all the same', 1),
('We are not all the same', 0),
('We has not all the same', 1),
('We is not all the same', 2)]
As two hypotheses have 0 grammar errors, the third pass is performed. The WMD is calculated between the original text and each hypothesis, and the list is updated with the WMD score. To calculate the WMD, first the text is translated into a vector space by using an embedding model. An embedding model can be trained for any language using various means such as Word2Vec [4] or GloVe [5]. Once the original text and each hypothesis is represented by a matrix of word vectors, the WMD can be calculated between the original text matrix and each hypothesis matrix to yield the WMD score. The result is (Hypothesis, WMD score, # of grammar errors present):

[('We have not all the same', 0.75, 0),
('We am not all the same', 0.81, 1),
('We are not all the same', 0.73, 0),
('We has not all the same', 0.72, 1),
('We is not all the same', 0.69, 2)]

This list is then sorted first by least number of grammar errors, and next by lowest WMD score:

[('We are not all the same', 0.73, 0),
('We have not all the same', 0.75, 0),
('We has not all the same', 0.72, 1),
('We am not all the same', 0.81, 1),
('We is not all the same', 0.69, 2)]

The first result in the list will then be returned as the expanded form of the original text. Original mappings of contractions to expansions can be provided externally for the languages that commonly use contractions (see [1] and [6] for example). In addition, an appropriate grammar checker and the embedding model can be selected.

A flow chart showing an exemplary set of steps for performing an automatic expansion of contractions in a text is provided at FIG. 1. As illustrated in FIG. 1, the system accesses an original text. The original text is analyzed to determine if simple contractions exist in the text. The system determines or finds the simple contractions in the original text and replaces them with their expanded form to produce an intermediate text—a partially expanded text. Then each of the contractions remaining in partially expanded text is expanded to create a plurality of corresponding possible expansions—a plurality of potential expanded texts, and each of the corresponding possible expansions is grammar checked and a grammar score is calculated and assigned for each possible expansion. Next, the original text or the partially expanded text and each of the partially expanded texts are modeled using word embedding. For each contraction in each of the plurality of potential expanded texts, the word movers distance score is calculated between a contraction in the modeled original text or partially expanded text and each of the contractions in the plurality of potential expanded texts. Then, based on the grammar score and the word mover's distance score for each expanded form, "best" expansions are selected, and a final expanded text generated, automatically.

As described above, in the first pass any contractions that can be replaced without context are fixed. On the second pass, if any contractions remain, the multiple rules are used to generate all possible hypothesis of expansions. Then each hypothesis is grammar checked and the number of grammatical errors in it is saved. If only one hypothesis has the least number of grammar errors, then that hypothesis is returned as the expanded form. If more than one hypothesis remains with the same number of grammar errors, then a third pass is performed. On the third pass any remaining hypothesis are converted into a matrix of word vectors using the supplied word embedding model. Then, the word vector matrix is passed to the WMD calculation along with the word vector matrix of the original input. The WMD is calculated between each hypothesis matrix and the original matrix and the hypothesis with the shortest WMD from the original is returned as the expanded form.

It should be noted that the principles described herein can be adapted to any text format, so long as word embedding and a WMD calculation can be performed so that the score calculations described herein can be performed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Throughout this application, various publications may have been referenced. The disclosures of these publications in their entireties are hereby incorporated by reference into this application in order to more fully describe the state of the art to which this invention pertains. Some publications of interest may be found at:

[1] Definition of contraction and language specific forms: https://en.wikipedia.org/wiki/contraction (grammar)
[2] Word Movers Distance: http://proceedings.mlr.press/v37/kusnerb15.pdf
[3] Word Embeddings: https://en.wikipedia.org/wiki/Word_embedding
[4] Word2Vec: https://en.wikipedia.org/wiki/Word2vec
[5] GloVe: https://nlp/stanford.edu/projects/glove/
[6] Example list of English contractions: https://en.wikipedia.org/wiki/wikipedia:List_of_English_contractions Presently known technology for expanding contractions requires manual construction of disambiguations or arbitrarily selects a replacement. This presently described system and method are driven by machine learning and statistics and improves the efficiency of the process by not requiring human decision making Therefore, imparting improved functioning of electronic text generation and editing.

Relevant to any task that requires precision in text understanding. Relevant to Machine Learning tasks that want to increase performance by preprocessing the text data to remove ambiguity.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A method of expanding contractions in electronically stored text without human intervention, wherein a library of contractions is available electronically comprising:
    identifying a contraction in the electronic text;
    substituting an expanded form of the contraction in the text for the contraction if the library of contractions defines only a single expanded form of the contraction;
    if the library of contractions defines more than one expanded form of the contraction, substituting each expanded form of the contraction in the text and performing a grammar check to provide a grammar score for each expanded form in context of the text and evaluating if only one expanded form is grammatically correct;
    if only one expanded form is grammatically correct, substituting the grammatically correct expanded form in the text for the contraction;
    if the more than one expanded form is grammatically correct or no expanded form is grammatically correct, measuring similarity of each expanded form with respect to the electronic text, wherein the measuring similarity comprises converting all expanded forms and the contraction to vector representations using a word embedding model and calculating a word movers distance for each expanded form with respect to the electronic text;

selecting an expanded form for substitution of the contraction in the text based on the grammar score and the measured similarity; and substituting the selected expanded form for the contraction in the text.

2. The method of claim 1, the identifying of contractions in the text comprising:
(a) reading the electronic text from an origin format in an electronic memory location of a computer into a working memory of the computer;
(b) analyzing the electronic text in the working memory, wherein analysis is performed in the working memory, to determine if contractions are present in the electronic text by accessing the library of contractions electronically; and
(c) returning the electronic text to the electronic memory location without further operation upon determining that no contractions are present after (b) and presenting the returned text as a final version of the text.

3. The method of claim 2, the substituting the expanded form of the contraction comprising:
(d) upon determining that the electronic text includes at least one contraction, expanding all simple contractions in the electronically available text, by accessing the library of contractions electronically, to generate an intermediate text, wherein the simple contractions have only one expanded form according to the library of contractions; and
(e) checking the intermediate text for unexpanded contractions and returning the intermediate text to the electronic memory location upon determining that no contractions are present after (d) and presenting the returned text as a final version of the text.

4. The method of claim 3, the substituting each expanded form of the contraction in the text, comprising:
(f) replacing all contractions in the intermediate text with all possible expanded contractions to generate a plurality of hypothetical texts, wherein each of the plurality of hypothetical text corresponds to a unique combination of expanded contractions; and
(g) checking grammatical correctness of all hypothetical texts and, upon determining that only one of the hypothetical texts has no grammatical errors, returning the one of the plurality of hypothetical texts having no grammatical errors to the electronic memory location and presenting the returned text as a final version of the electronic text.

5. The method of claim 3, the substituting each expanded form of the contraction in the text, comprising:
(f) replacing all contractions in the intermediate text with all possible expanded contractions to generate a plurality of hypothetical texts, wherein each of the plurality of hypothetical text corresponds to a unique combination of expanded contractions; and
(g) checking grammatical correctness of all hypothetical texts and, upon determining that none of the hypothetical texts is grammatically correct,
(h) upon determining that none of the plurality of hypothetical texts have no grammatical errors, converting all of the plurality of hypothetical texts to word vectors and calculating a word mover's distance for each expanded contraction in each of the plurality of hypothetical texts to a corresponding contraction in the electronic text; and
(i) returning the one of the plurality of hypothetical texts having a shortest word mover's distance to the electronic memory location and presenting the returned text as a final version of the electronic text.

6. The method of claim 5, further comprising upon determining that at least two of the hypothetical texts has the same shortest word mover's distance, returning the one of the at least two of the hypothetical texts having fewest grammar errors to the electronic memory location.

7. A non-transitory computer readable medium comprising instructions that, when executed by a processor of a processing system, cause the processing system to perform a method, the method comprising:

identifying a contraction in the electronic text;

substituting an expanded form of the contraction in the text for the contraction if the library of contractions defines only a single expanded form of the contraction;

if the library of contractions defines more than one expanded form of the contraction, substituting each expanded form of the contraction in the text and performing a grammar check to provide a grammar score for each expanded form in context of the text and evaluating if only one expanded form is grammatically correct;

if only one expanded form is grammatically correct, substituting the grammatically correct expanded form in the text for the contraction;

if the more than one expanded form is grammatically correct or no expanded form is grammatically correct, measuring similarity of each expanded form with respect to the electronic text, wherein the measuring similarity comprises converting all expanded forms and the contraction to vector representations using a word embedding model and calculating a word movers distance for each expanded form with respect to the electronic text;

selecting an expanded form for substitution of the contraction in the text based on the grammar score and the measured similarity; and substituting the selected expanded form for the contraction in the text.

8. The non-transitory computer readable medium of claim 7, wherein the identifying of contractions in the text comprises:
(a) reading the electronic text from an origin format in an electronic memory location of a computer into a working memory of the computer;
(b) analyzing the electronic text in the working memory, wherein analysis is performed in the working memory, to determine if contractions are present in the electronic text by accessing the library of contractions electronically; and
(c) returning the electronic text to the electronic memory location without further operation upon determining that no contractions are present after (b) and presenting the returned text as a final version of the text.

9. The non-transitory computer readable medium of claim 7, wherein the substituting the expanded form of the contraction comprises:
(d) upon determining that the electronic text includes at least one contraction, expanding all simple contractions in the electronically available text, by accessing the library of contractions electronically, to generate an intermediate text, wherein the simple contractions have only one expanded form according to the library of contractions; and (e) checking the intermediate text for unexpanded contractions and returning the intermediate text to the electronic memory location upon determining that no contractions are present after (d) and presenting the returned text as a final version of the text.

10. The non-transitory computer readable medium of claim 8, wherein the substituting each expanded form of the contraction in the text comprises:

(f) replacing all contractions in the intermediate text with all possible expanded contractions to generate a plurality of hypothetical texts, wherein each of the plurality of hypothetical text corresponds to a unique combination of expanded contractions; and (g) checking grammatical correctness of all hypothetical texts and, upon determining that only one of the hypothetical texts has no grammatical errors, returning the one of the plurality of hypothetical texts having no grammatical errors to the electronic memory location and presenting the returned text as a final version of the electronic text.

11. The non-transitory computer readable medium of claim 8, wherein the substituting each expanded form of the contraction in the text comprises:

(f) replacing all contractions in the intermediate text with all possible expanded contractions to generate a plurality of hypothetical texts, wherein each of the plurality of hypothetical text corresponds to a unique combination of expanded contractions; and (g) checking grammatical correctness of all hypothetical texts and, upon determining that none of the hypothetical texts is grammatically correct, (h) upon determining that none of the plurality of hypothetical texts have no grammatical errors, converting all of the plurality of hypothetical texts to word vectors and calculating a word mover's distance for each expanded contraction in each of the plurality of hypothetical texts to a corresponding contraction in the electronic text; and (i) returning the one of the plurality of hypothetical texts having a shortest word mover's distance to the electronic memory location and presenting the returned text as a final version of the electronic text.

12. The non-transitory computer readable medium of claim 11, further comprising upon determining that at least two of the hypothetical texts has the same shortest word mover's distance, returning the one of the at least two of the hypothetical texts having fewest grammar errors to the electronic memory location.

13. A system for performing speech analytics, comprising:
a memory comprising executable instructions;
a processor configured to execute the executable instructions and cause the system to:
identify a contraction in the electronic text;
substitute an expanded form of the contraction in the text for the contraction if the library of contractions defines only a single expanded form of the contraction;
if the library of contractions defines more than one expanded form of the contraction, substitute each expanded form of the contraction in the text and perform a grammar check to provide a grammar score for each expanded form in context of the text and evaluate if only one expanded form is grammatically correct;

if only one expanded form is grammatically correct, substitute the grammatically correct expanded form in the text for the contraction;

if the more than one expanded form is grammatically correct or no expanded form is grammatically correct, measure similarity of each expanded form with respect to the electronic text, wherein the measuring similarity comprises converting all expanded forms and the contraction to vector representations using a word embedding model and calculating a word movers distance for each expanded form with respect to the electronic text;

select an expanded form for substitution of the contraction in the text based on the grammar score and the measured similarity; and substitute the selected expanded form for the contraction in the text.

14. The system of claim 13, wherein the instructions for the identifying of contractions in the text cause the system to:

(a) read the electronic text from an origin format in an electronic memory location of a computer into a working memory of the computer;

(b) analyze the electronic text in the working memory, wherein analysis is performed in the working memory, to determine if contractions are present in the electronic text by accessing the library of contractions electronically; and (c) return the electronic text to the electronic memory location without further operation upon determining that no contractions are present after (b) and present the returned text as a final version of the text.

15. The system of claim 13, wherein the instructions for the substituting the expanded form of the contraction cause the system to:

(d) upon determining that the electronic text includes at least one contraction, expand all simple contractions in the electronically available text, by accessing the library of contractions electronically, to generate an intermediate text, wherein the simple contractions have only one expanded form according to the library of contractions; and (e) check the intermediate text for unexpanded contractions and return the intermediate text to the electronic memory location upon determining that no contractions are present after (d) and present the returned text as a final version of the text.

16. The system of claim 14, wherein the instructions for the substituting each expanded form of the contraction in the text cause the system to:

(f) replace all contractions in the intermediate text with all possible expanded contractions to generate a plurality of hypothetical texts, wherein each of the plurality of hypothetical text corresponds to a unique combination of expanded contractions; and (g) check grammatical correctness of all hypothetical texts and, upon determining that only one of the hypothetical texts has no grammatical errors, return the one of the plurality of hypothetical texts having no grammatical errors to the electronic memory location and present the returned text as a final version of the electronic text.

17. The system of claim 14, wherein the instructions for the substituting each expanded form of the contraction in the text cause the system to:

(f) replace all contractions in the intermediate text with all possible expanded contractions to generate a plurality of hypothetical texts, wherein each of the plurality of hypothetical text corresponds to a unique combination of expanded contractions; and (g) check grammatical correctness of all hypothetical texts and, upon determining that none of the hypothetical texts is grammatically correct, (h) upon determining that none of the plurality of hypothetical texts have no grammatical errors, convert all of the plurality of hypothetical texts to word vectors and calculate a word mover's distance for each expanded contraction in each of the plurality of hypothetical texts to a corresponding contraction in the electronic text; and (i) return the one of the plurality of hypothetical texts having a shortest word mover's distance to the electronic memory location and present the returned text as a final version of the electronic text.

18. The system of claim 17, further comprising instructions to cause the system to, upon determining that at least two of the hypothetical texts has the same shortest word mover's distance, return the one of the at least two of the hypothetical texts having fewest grammar errors to the electronic memory location.

\* \* \* \* \*